(12) United States Patent
Gold et al.

(10) Patent No.: US 8,534,502 B2
(45) Date of Patent: Sep. 17, 2013

(54) DISPENSER FOR POWDERED FOODSTUFFS

(75) Inventors: Jonathan Morris Gold, London (GB);
Daniel Jason Tyler, Milton Keynes (GB); Christopher Earl Nightingale, London (GB)

(73) Assignee: Brother Max Limited, Borehamwood (GB)

( * ) Notice: Subject to any disclaimer, the term of this patent is extended or adjusted under 35 U.S.C. 154(b) by 856 days.

(21) Appl. No.: 12/600,857

(22) PCT Filed: Jun. 6, 2008

(86) PCT No.: PCT/GB2008/001927
§ 371 (c)(1),
(2), (4) Date: Nov. 19, 2009

(87) PCT Pub. No.: WO2008/152362
PCT Pub. Date: Dec. 18, 2008

(65) Prior Publication Data
US 2010/0147888 A1    Jun. 17, 2010

(30) Foreign Application Priority Data

Jun. 12, 2007 (GB) .................................. 0711290.7
Mar. 28, 2008 (GB) .................................. 0805622.8

(51) Int. Cl.
*B67D 7/78* (2010.01)
(52) U.S. Cl.
USPC ..... 222/144; 222/129; 222/144.5; 222/145.1; 222/460; 222/575; 141/297

(58) Field of Classification Search
USPC ................... 222/144, 144.5, 145.1, 129, 132, 222/460, 461; 220/573.4, 527, 528–529, 220/574–575; 141/297, 331, 332–333, 345, 141/234, 237, 391
See application file for complete search history.

(56) References Cited

U.S. PATENT DOCUMENTS

| | | | | |
|---|---|---|---|---|
| 618,219 A * | 1/1899 | Bell | ............................... | 222/144 |
| 1,424,682 A * | 8/1922 | Schlosser | ...................... | 222/144 |
| 1,729,287 A * | 9/1929 | Giltner | .......................... | 222/144 |
| 2,302,186 A * | 11/1942 | Caretto | ....................... | 222/142.3 |
| 3,567,076 A * | 3/1971 | Zanussi | ......................... | 222/144 |

(Continued)

FOREIGN PATENT DOCUMENTS

| | | |
|---|---|---|
| GB | 2296711 A1 | 7/1996 |
| GB | 2438849 A1 | 12/2007 |
| JP | 07309379 A | 11/1995 |
| WO | WO 2006/054035 A | 5/2006 |

*Primary Examiner* — Frederick C. Nicolas

(57) ABSTRACT

There is provided a dispenser for use in dispensing distinct portions of a powdered foodstuff. The dispenser has a container defining an interior in the form of a basin, the basin provided with a dispensing outlet; and receivable by and movable within the basin, an insert provided with plural open compartments each for holding a distinct portion of the powdered foodstuff. Each open compartment of the insert is provided with a compartment outlet arranged such that by moving the insert within the basin one compartment outlet at a time may be brought into registration with the dispensing outlet for dispensing of the distinct portion of the powdered foodstuff held thereby.

22 Claims, 15 Drawing Sheets

(56) References Cited

U.S. PATENT DOCUMENTS

| | | | |
|---|---|---|---|
| 3,983,993 A * | 10/1976 | Hsu | 206/1.7 |
| 4,705,192 A * | 11/1987 | Knapton | 222/144.5 |
| 4,993,584 A * | 2/1991 | Macario | 220/523 |
| 6,116,455 A | 9/2000 | Rossman et al. | |
| 6,644,366 B2 * | 11/2003 | Johnson | 141/331 |
| 6,974,056 B2 * | 12/2005 | Rea | 222/460 |
| 7,806,298 B2 * | 10/2010 | Kraus et al. | 222/129 |
| 2010/0206886 A1 * | 8/2010 | Gold et al. | 220/575 |

* cited by examiner

DISPENSER FOR POWDERED FOODSTUFFS

TECHNICAL FIELD

The present invention relates to a dispenser that is suitable for one portion at a time dispensing of pre-measured portions of a foodstuff in dry powder form, particularly a powdered baby milk preparation.

BACKGROUND TO THE INVENTION

Infant feeding bottles for feeding babies with milk or other liquids ('baby bottles') are well-known in the art, as are powdered baby milk preparations for use therewith. In a typical usage operation, the bottle container of the baby bottle is charged with a measured portion of the powdered baby milk preparation taken from a bulk container and a measured amount of water is then added. The teat is then fixed to the bottle container by means of a fixing ring, and the now sealed bottle is agitated to dissolve the powdered baby milk preparation. It is known to be important to accurately measure the portion of powdered baby milk preparation to ensure correct concentration and consistency of the baby milk for feeding of the baby. Various simple measuring devices (e.g. spoon-like measures) have been proposed for measuring the powder from the bulk container and transferring it to the baby bottle container.

A baby may require six to eight feeds a day, and to save time, parents or carers often make up several baby bottles in one go. Thus, several operations of measuring the powdered baby milk preparation from the bulk container to each of several baby bottles are conducted in one go. Each baby bottle may then be loaded with water to make up the liquid baby milk as above, or some of the bottles may simply be left charged with the measure of baby milk preparation and ready for later addition of water. The latter operation is preferable from a freshness standpoint in that the baby milk may then be made up (i.e. by adding water) just before feeding it to the baby. A problem associated with both of the above 'multi-bottle' powder pre-loading operations is that of course, multiple baby bottles are required. Where the parent and child are 'out and about' this can be particularly inconvenient in that the baby bottles are bulky to pack.

In solution to the above problem, there have been proposed baby milk powder dispensers that are arranged to be loaded with multiple pre-measured portions of powdered baby milk preparation. Thus, simple lidded containers comprising multiple (e.g. three or four) compartments have been proposed. In use, each compartment is pre-loaded with a measured portion of powdered milk preparation, and then at feeding time one such portion is removed (e.g. by spooning out) from one compartment to be loaded into the baby feeding bottle. Applicant has now realized that a problem with such simple, multi-compartment lidded containers is that they do not readily facilitate the dispensing of the desired single measured portion into the baby feeding bottle.

In solution to this problem, Applicant has now devised the dispenser provided herein, which provides ease of loading and separate storage of plural measured powder portions and also ease of one portion at a time dispensing of each portion such as to load a baby bottle. The dispenser herein is further arranged to be relatively compact such as to make it convenient for carrying in the bag or indeed, coat pocket of a parent or carer.

SUMMARY OF THE INVENTION

According to a first aspect of the present invention there is provided a dispenser for use in dispensing distinct portions of a powdered foodstuff comprising a container defining an interior in the form of a basin, said basin provided with a dispensing outlet; and receivable by and movable within said basin, an insert provided with plural open compartments each for holding a distinct portion of said powdered foodstuff;

wherein each open compartment of said insert is provided with a compartment outlet arranged such that by moving the insert within the basin one said compartment outlet at a time may be brought into registration with the dispensing outlet for dispensing of said distinct portion of the powdered foodstuff held thereby.

There is provided a dispenser for use in dispensing distinct portions of a powdered foodstuff. Preferably, that powdered foodstuff is a powdered baby milk preparation.

The dispenser comprises a container defining an interior in the form of a basin or bowl. The basin or bowl suitably comprises a circular base, a circumferential basin wall extending from the base, and a circular mouth defined by the uppermost (i.e. most distant from the base) extent of that circumferential basin wall. The circumferential wall may in embodiments, extend in perpendicular fashion from the basin base or at an angle to that perpendicular (e.g. tapering outwards). The circular mouth may be provided with a rim.

In embodiments, a sealing lid is provided to the container to close off the mouth thereof. In embodiments, that sealing lid interacts in suitable sealing fashion (e.g. snap-fit, screw-fit or push-fit) with a rim provided to the uppermost part of the circumferential basin wall that defines the mouth.

The basin is provided with a dispensing outlet. In embodiments, that dispensing outlet is provided to the circumferential basin wall. In other embodiments, that dispensing outlet is provided to the base of the basin. In embodiments, the dispensing outlet is provided with a closure (e.g. a stopper, plug, screw closure or lid) such as to allow for reversible closing off thereof. In embodiments, a tether secures the closure to the container. In embodiments, a docking element to the container is provided for docked receipt of the closure when removed from the dispensing outlet.

In embodiments, the dispensing outlet defines a spout that is arranged to channel the powder dispensed there through. Where the dispenser is designed for dispensing of powdered baby milk preparation the shape and form of that spout is preferably arranged to fit within the opening of a baby bottle container for effective channelling of dispensed baby milk preparation there into.

The basin is provided with an insert that is both receivable by and movable within the basin. The outer profile of the insert is generally arranged to facilitate its receipt by the basin from interior of the container, and thus the outer profile of the insert is generally basin-like, and defines an outer base and outer circumferential wall.

In embodiments, the basin and/or insert are provided with any number of guides, tracks or grooves that facilitate movement of the insert within the basin. Generally, the insert is rotatably movable within the basin about a rotational axis that centres at the centre point of the circular base of the container.

The insert provided with plural (e.g. from three to six) open compartments each for holding a distinct portion of the powdered foodstuff. In embodiments, the insert defines a generally basin-like interior and the compartments are arranged in radially spaced fashion about that interior. Thus, each compartment suitably defines a segment of the basin-like interior with each compartment being separated by compartment walls that extend from the central point of the basin-like interior of the insert (e.g. in propeller fashion).

In embodiments, the sealing lid is provided with a retainer feature arranged to interact with the insert to thereby prevent movement (e.g. rotation) of that insert when the sealing lid is in place. In embodiments, that retainer feature comprises a cavity shaped to receive part of the upper edge of the compartment walls of the insert. That cavity may for example be propeller-shaped and arranged to receive a propeller-like portion of the upper edge of the compartment walls.

In embodiments, gradated markings are provided along the inner surface of the compartment walls of the insert to allow the user to see how much powdered foodstuff is present in the interior of each compartment of the insert.

Each compartment of the insert is provided with a compartment outlet. The compartments are arranged (i.e. located) such that by moving the insert within the basin one said compartment outlet at a time may be brought into registration with the dispensing outlet for dispensing of said distinct portion of the powdered foodstuff held thereby. Thus, in use aspects the insert is moved (e.g. rotated) within the container such as to bring a compartment outlet of a first compartment into registration with the dispensing outlet to thereby allow dispensing of the powdered food portion from (only) that first compartment through its compartment outlet and dispensing outlet. In a subsequent use aspect, the insert must be moved (e.g. rotated) again to bring the compartment outlet of a second compartment into registration with the dispensing outlet to thereby allow dispensing of the powdered food portion from (only) that second compartment through its compartment outlet and dispensing outlet.

In embodiments, the container and the insert are provided with indicators (e.g. visual markers) for indicating when a compartment outlet of the insert has been brought into registration with the dispensing outlet. Thus, in embodiments an indicator on the insert is brought into visual registration/alignment with an indicator on the container at a position corresponding to a registration position of the dispensing outlet and a compartment outlet of the insert.

In embodiments, the container and the insert are provided with engagement features that come into engagement when a compartment outlet of the insert has been brought into registration with the dispensing outlet. Thus, in embodiments an engagement feature on the insert is brought into engagement with an engagement feature of the container at a position corresponding to a registration position of the dispensing outlet and a compartment outlet of the insert. The engagement features of the container and/or insert may have any suitable mutually engaging form and may thus, take the form of one or more protrusions (e.g. nibs, ribs, dimples or bobbles), indents (e.g. cavities or grooves) or other suitable forms.

In embodiments, the base of the container is provided with one or more engagement features at the inner surface thereof, and the base of the insert is provided with one or more corresponding engagement features at the outer surface thereof. Suitably, those one or more engagement features are radially spaced about the centre of the base of the insert and/or the base of the container.

In embodiments, a side wall of the container is provided with one or more engagement features at the inner surface thereof, and a side wall of the insert is provided with one or more corresponding engagement features at the outer surface thereof. In embodiments, the one or more engagement features are radially spaced about the side wall of the insert and/or the side wall of the container.

In embodiments, the number of engagement features provided to each of the container and or insert corresponds to the number of compartments of the insert.

In embodiments, and to assist with filling of the plural compartments of the insert, the dispenser may be optionally provided with a removable funnel. The funnel is generally provided as one kit part of a kit of parts, the main part of which is the dispenser. That funnel is arranged such that its bottom-located funnel exit sits about the mouth of the insert. The funnel interior is sub-divided by walls to mirror the compartment walls of the insert. Thus, the funnel interior is provided with plural (e.g. from three to six) open sub-divisions (e.g. segments) compartments each for funnelling (channelling) a distinct portion of the powdered foodstuff to an open compartment of the insert.

Generally, the dispenser is formed of a plastic polymer material. In embodiments, the sealing lid is clear in form (e.g. colourless) to allow the user to see how many distinct portions of powdered foodstuff remain (i.e. how many compartments are still to be dispensed from) without removing that lid.

It will be appreciated that any of the elements of the dispenser herein may be manufactured and supplied separately and for supplied as a pre-assembly or a kit of parts. The present invention encompasses all of these separate component parts and any assemblies thereof.

BRIEF DESCRIPTION OF THE DRAWINGS

The invention will now be described further with reference to the accompanying drawings, in which:—

Referring now to the drawings, FIG. 1 shows a container 10 that defines an interior in the form of a basin 12 that is arranged for receipt of an insert 50 to provide the first dispenser 1 herein as shown in FIG. 2. That first dispenser 1 may be provided with a sealing lid 5 made of a transparent material as shown in FIGS. 3 and 4.

Figure 5:
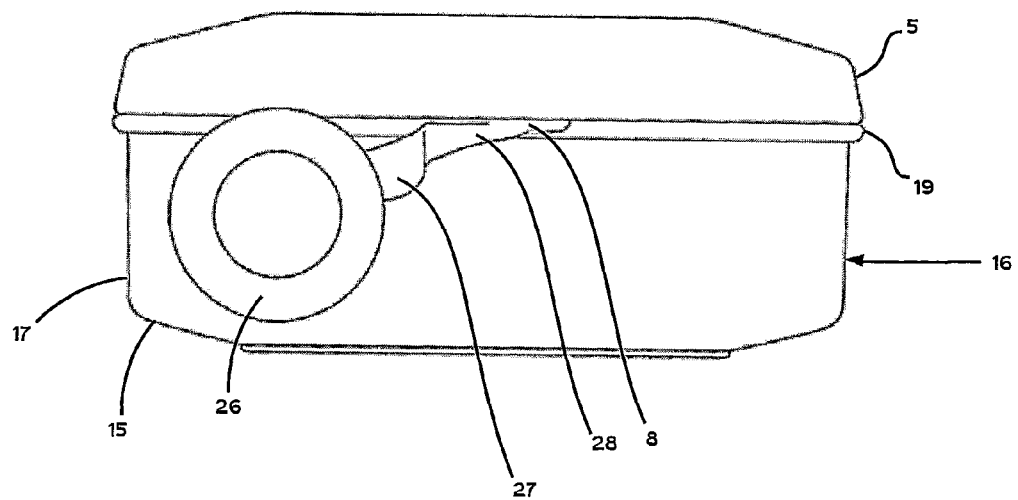
FIGS. 5 and 6 respectively show side views from the front and a first side of the first dispenser with sealing lid of FIG. 3.
Figure 6:
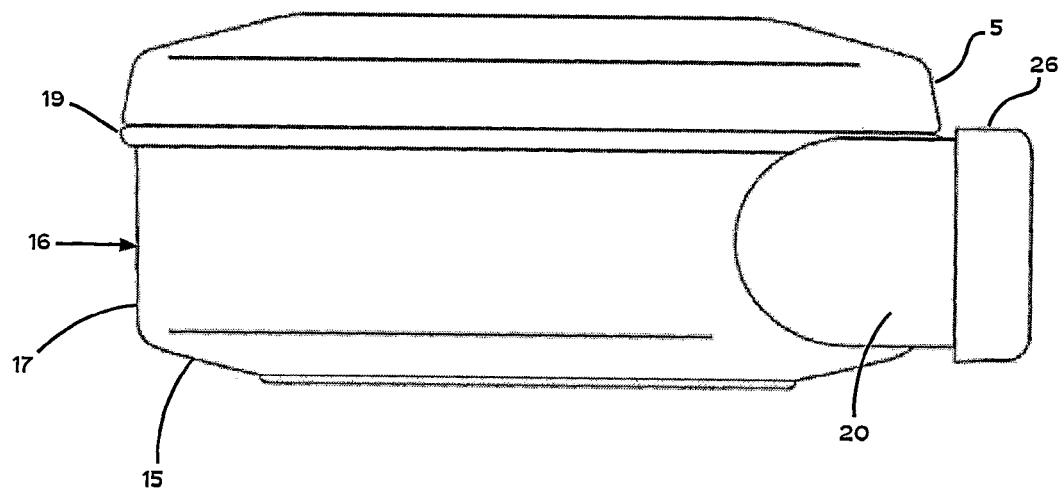
Figure 7:
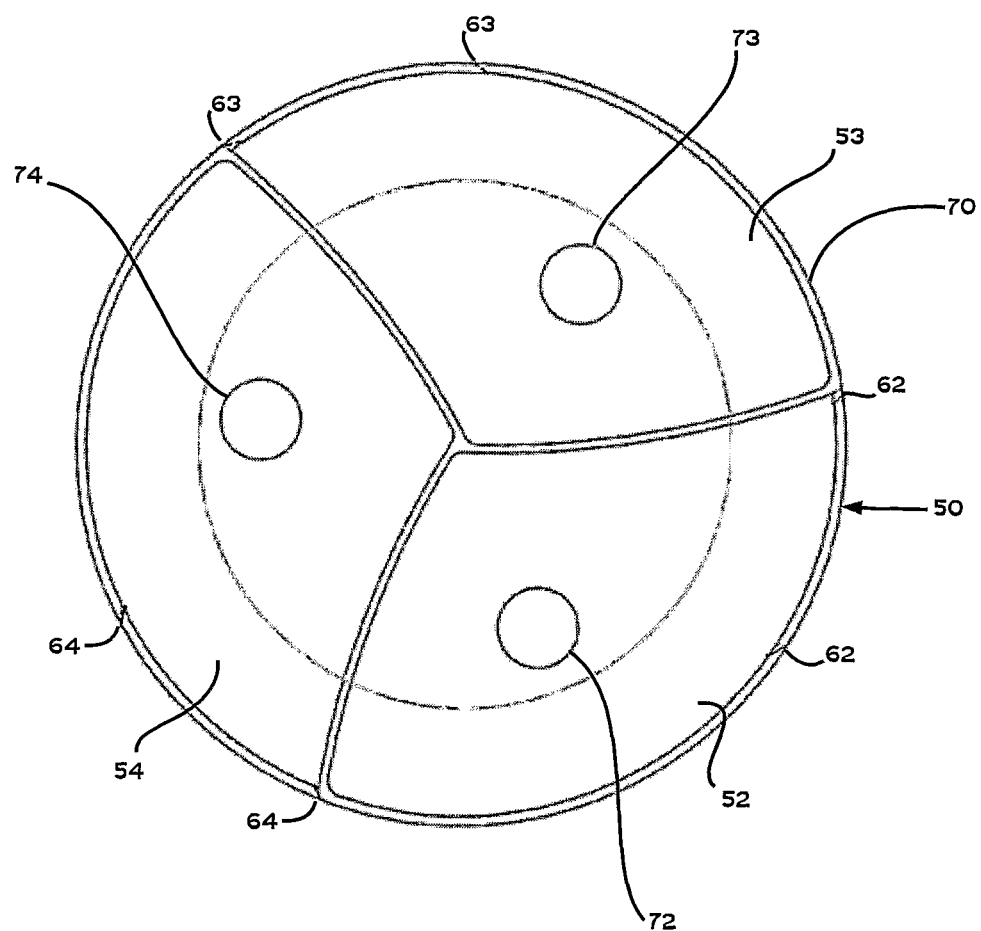
FIG. 7 shows a top view of the insert (only) that is shown as part of the first dispenser of FIGS. 2 to 4.

In more detail, and with reference also to FIGS. 5 and 6, the container 10 may be seen to comprise a circular inner base 14; a circumferential basin wall 16 extending from said circular inner base 14 and defining both a lower circumferential wall portion 15 that extends at an obtuse angle from the base 14 and an upper circumferential wall portion 17 that is perpendicular to the circular base 14; and a circular mouth 18 defined by the uppermost extent of the upper circumferential wall portion 17. The sealing lid 5 may be seen to reversibly attach in snap-fit fashion to rim 19 that extends around the mouth 18 of the container 10. Handles 6, 8 (only two visible) are also provided spaced at 120° angular separation about the rim 19. Finger grips 3, 4 are further provided (two only visible) spaced at 120° angular separation about the sealing lid 5.

The container 10 may also be seen to be provided at the upper portion 17 of the circumferential basin wall 16 with a dispensing outlet 20 in the form of a spout defining a circular exit hole 22. That circular exit hole is provided with a reversible closure in the form of plug 24 having plug surround 26, which attaches by means of tether 27 to tether point 28 provided to one handle 8 of the rim 19 of the container 10.

Insert 50, which defines a reverse basin-like outer profile (see FIG. 4), is receivable by and movable within the basin 12 interior of the container 10. The insert 50 defines a basin-like interior and is provided with three radially-spaced (120° angular segments) open compartments 52, 53, 54 each arranged for holding a distinct portion of a powdered foodstuff. The open compartments 52, 53, 54 are defined by a propeller-like wall divider structure 56. Each open compartment 52, 53, 54 of the insert 50 is provided with a compartment outlet 62, 63, 64. As will become clear from the more detailed later description, the compartment outlets 62, 63, 64 are arranged such that by rotatably moving the insert 50 within the basin 12 of the container 10 one compartment outlet 62, 63, 64 at a time may be brought into registration with the dispensing outlet 20 for dispensing of the distinct portion of the powdered foodstuff held within the compartment 52, 53, 54 associated therewith. The sealing lid 5 is provided with a propeller-shaped cavity portion 7 that is arranged when the lid is in place (i.e. as at FIG. 3) to receive and retain the propeller-shaped wall divider 56 of the insert 50, thereby preventing the insert 50 moving around within the container 10 during transit.

Figure 1:
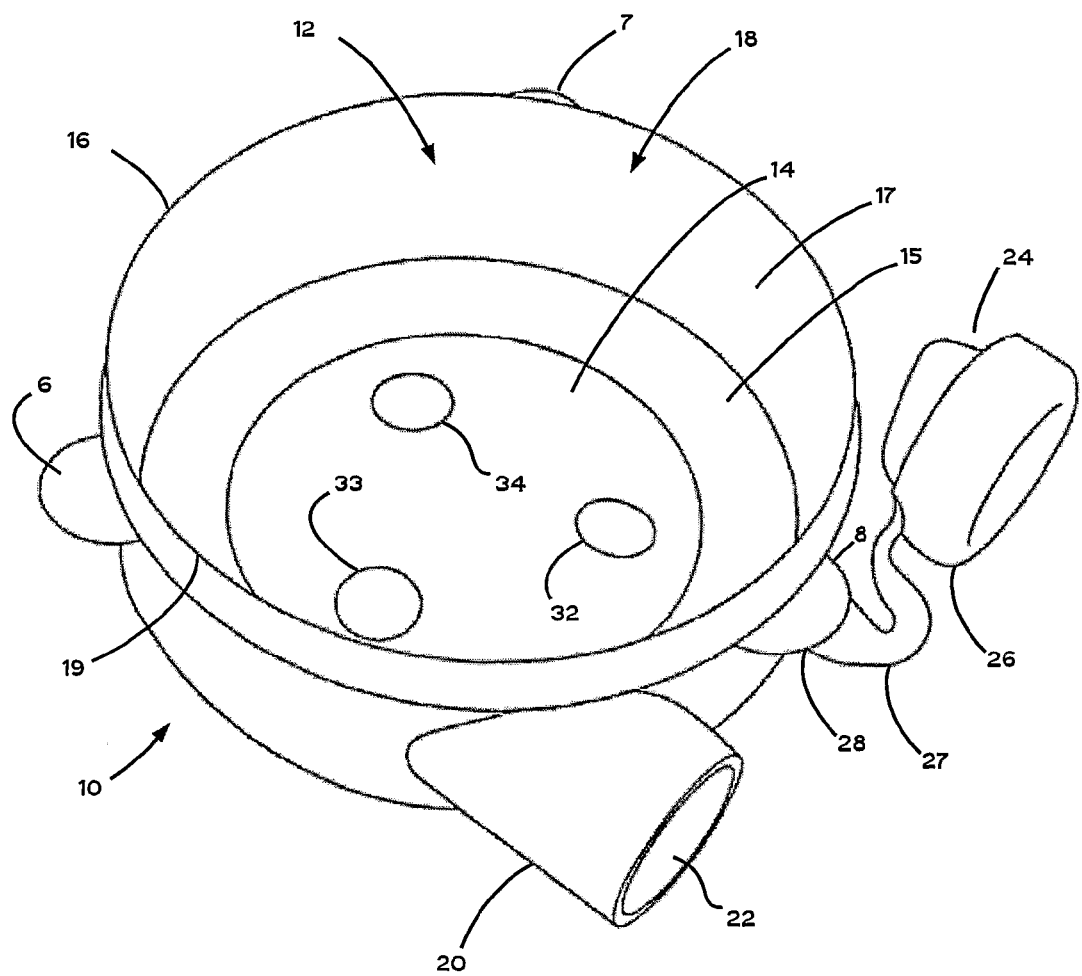
FIG. 1 shows a perspective view from above of a container of a first dispenser herein.
Figure 2:
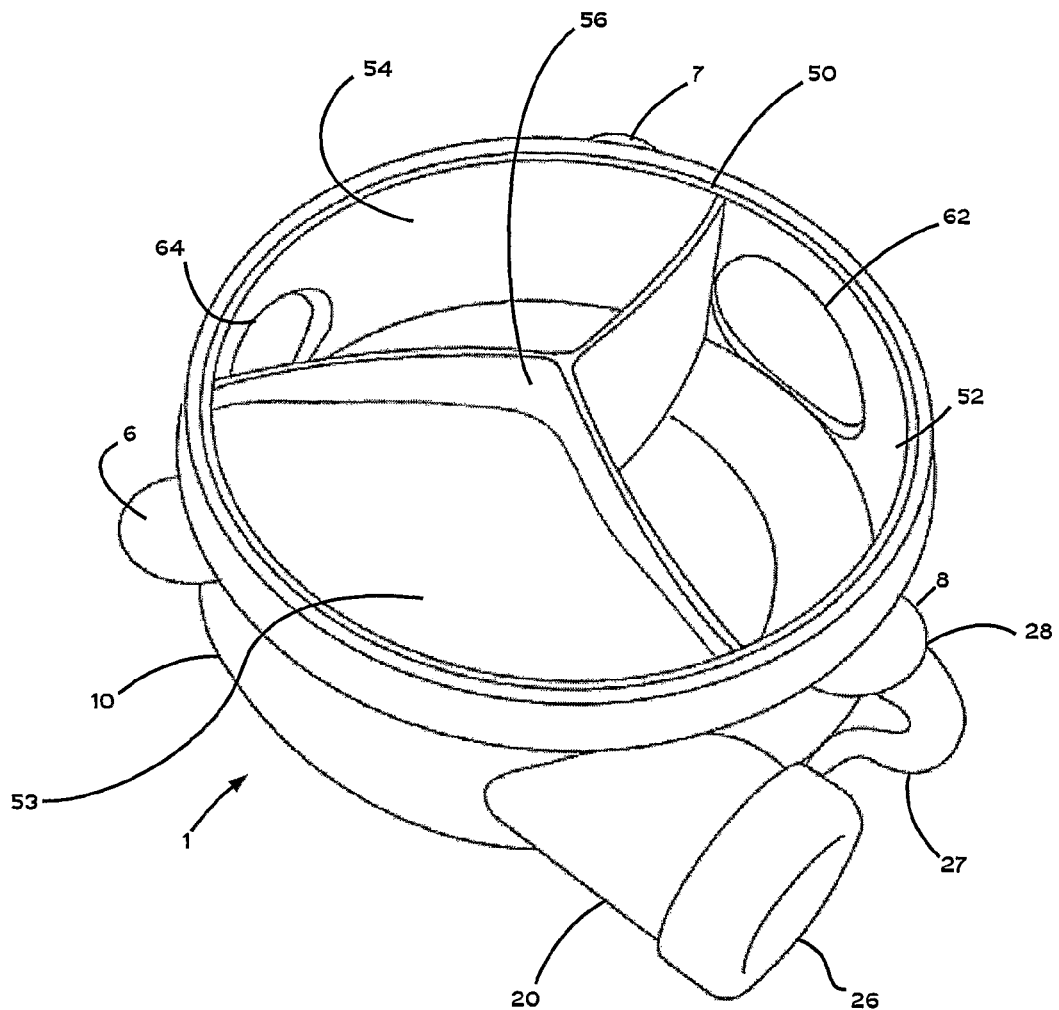
FIG. 2 shows a perspective view from above of a first dispenser herein comprising the container of FIG. 1 and an insert provided thereto.
Figure 4:
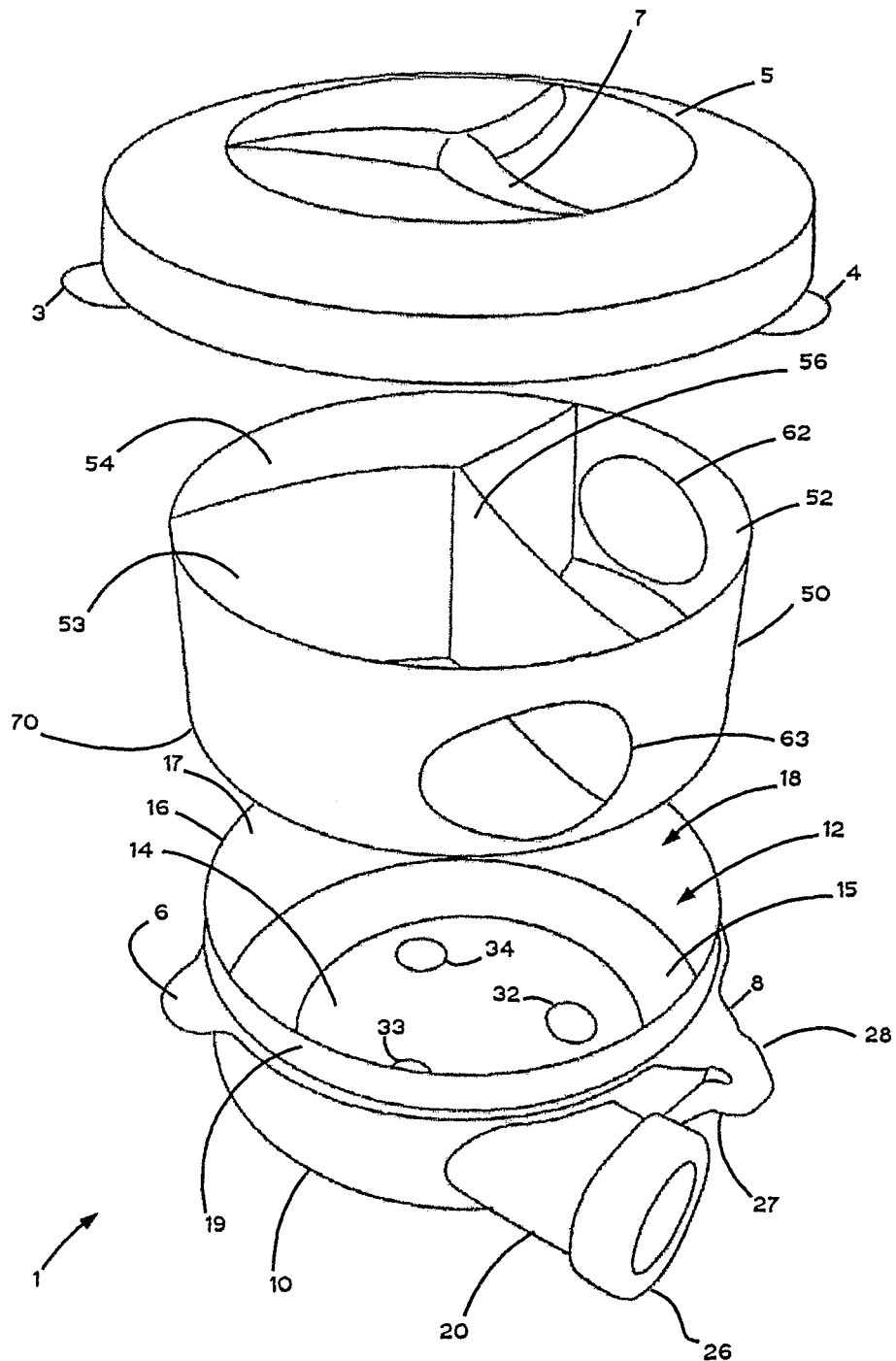
FIG. 4 shows an exploded perspective view of the first dispenser with sealing lid of FIG. 3.

Referring in particular to FIGS. 1 and 4 it may be seen that the inner base 14 of the container 10 is provided with engagement features in the form of three protruding circular dimples 32, 33, 34 spaced at 120° angular spacing relative to each other. The outer base 70 of the insert 50 is likewise provided with corresponding engagement features in the form of three circular indents 72, 73, 74 also spaced at 120° angular spacing relative to each other. The dimples 32, 33, 34 and indents 72, 73, 74 are arranged such as to come into engagement with each other when a compartment outlet 62, 63, 64 of the insert 50 has been brought into registration with the dispensing outlet 20 for dispensing therefrom.

Figure 9:
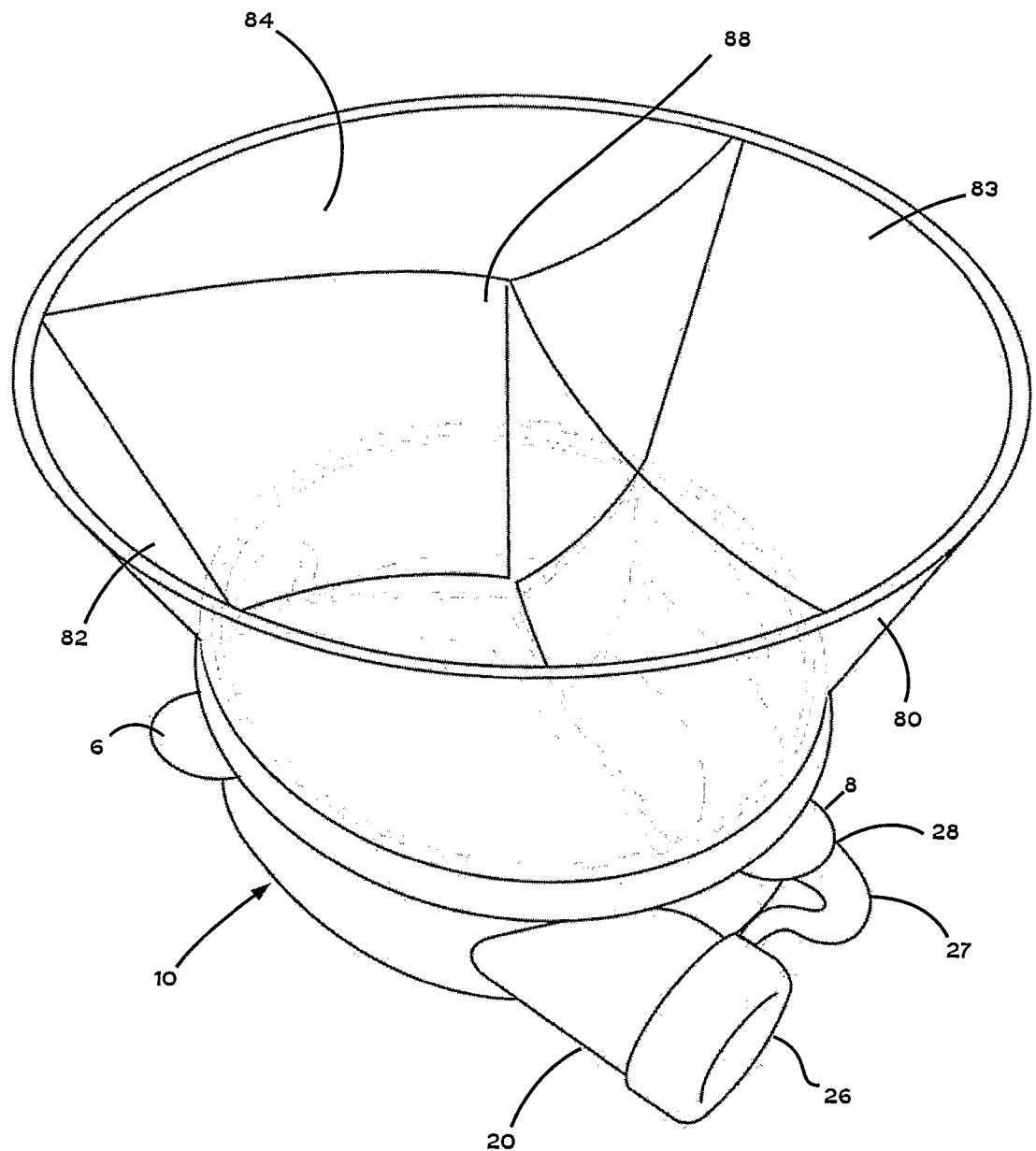
FIG. 9 shows a perspective view of the first dispenser of FIG. 3 now provided with a filling funnel.

FIG. 9 shows an optional feature of the first dispenser 1 herein in the form of a funnel 80 that is arranged for removable fitting to the rim 19 that defines the mouth 18 of the container 10. It will be seen that the interior of the funnel 80 is sub-divided by a propeller-like funnel wall structure 88 to define an arrangement of funnel compartments 82, 83, 84 that mirror the arrangement of the compartments 52, 53, 54 of the insert 50.

Figure 3:
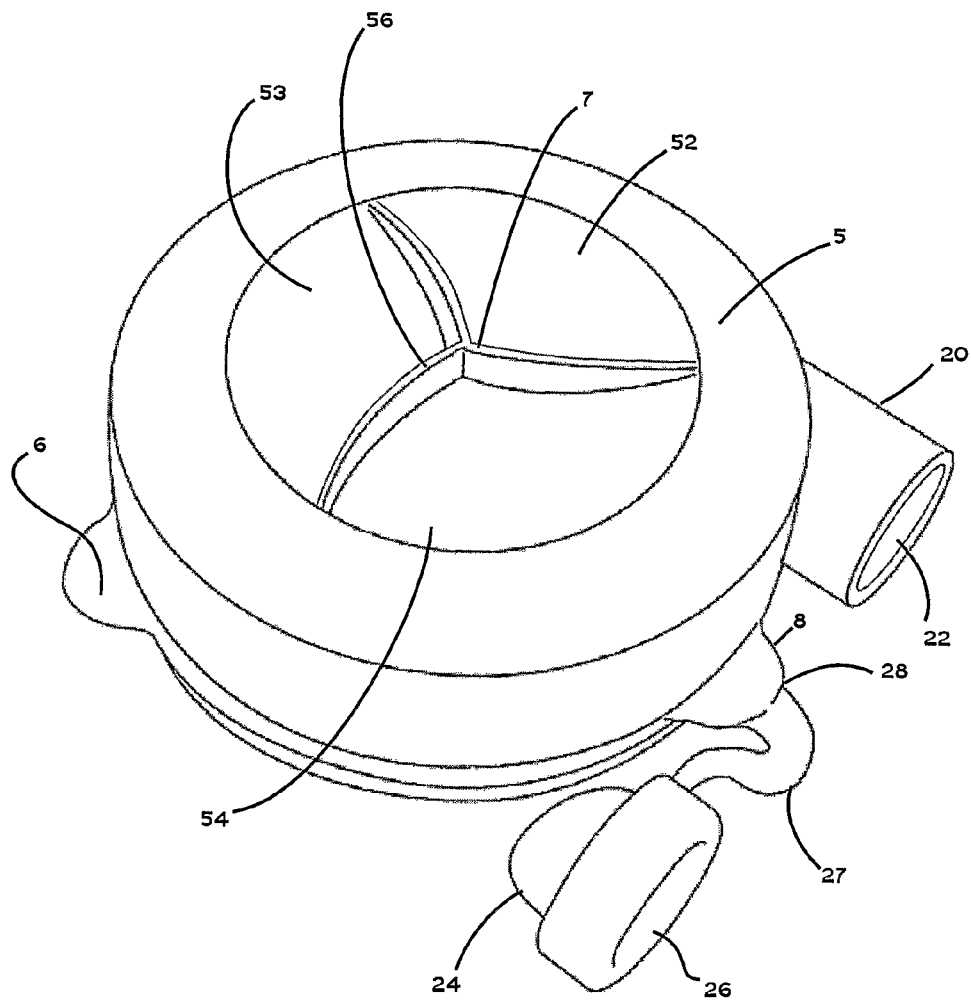
FIG. 3 shows a perspective view from above of the first dispenser of FIG. 2 now provided with a sealing lid.

Use of the first dispenser 1 is now described. In a filling operation, the insert 50 sits within the container 10 and the sealing lid 5 is removed (i.e. the configuration as shown in FIG. 3). One or more (typically, all) of the compartments 52, 53, 54 of the insert 50 are loaded, each with a measured portion of a powdered foodstuff. The funnel 80 as shown in FIG. 9 may be used in this filling operation or alternatively, the compartments 52, 53, 54 are simply loaded with a spoon-like measure. The sealing lid 5 may then be replaced in snap-fit fashion and the first dispenser 1 may then be carried around until dispensing of a powdered foodstuff portion is required.

Figure 8:
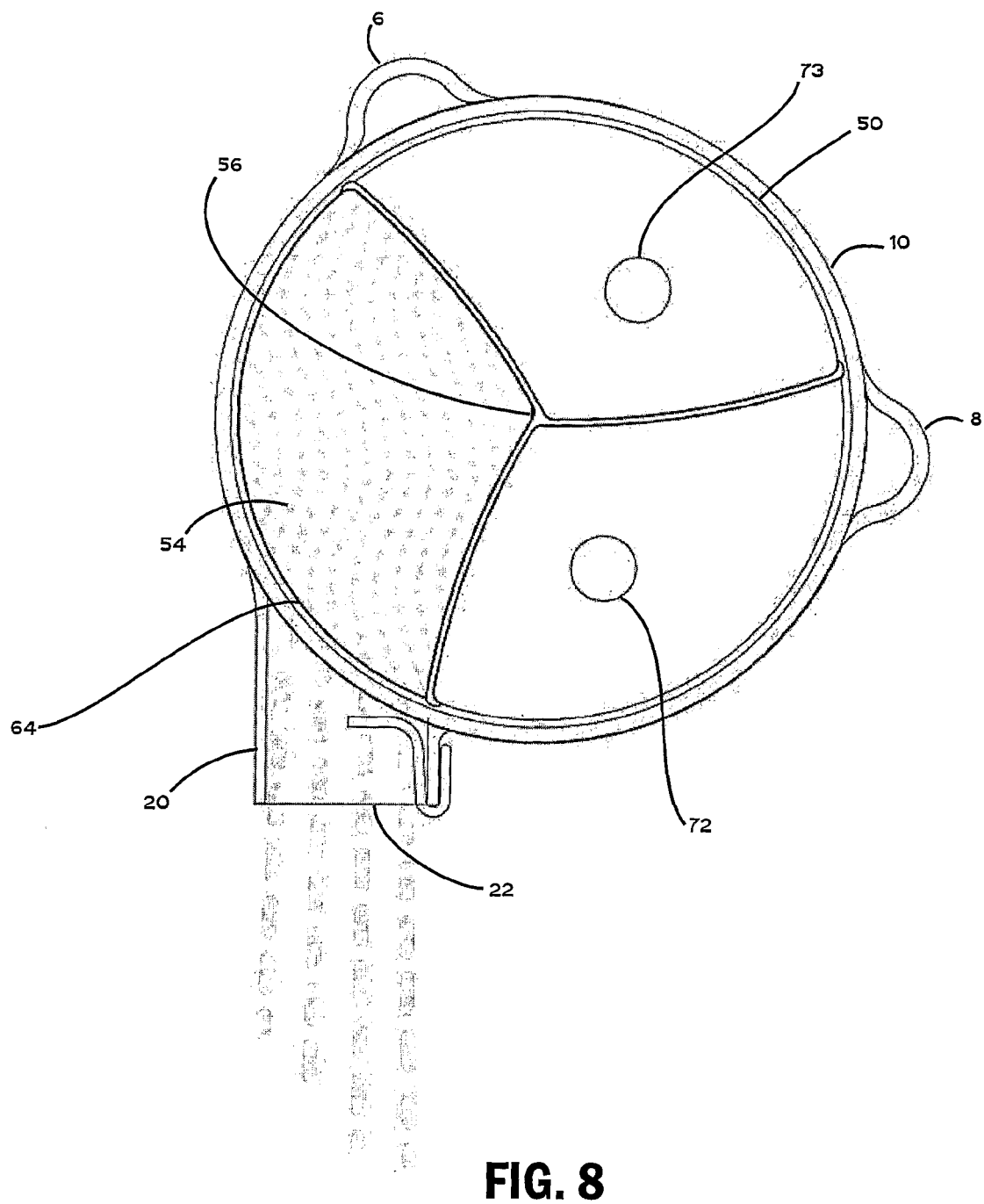
FIG. 8 shows a top view of the first dispenser of FIG. 3 during an illustrative dispensing operation.

In a dispensing operation, the sealing lid 5 is removed and the insert 50 rotated within the basin-like interior 12 of the container until as shown at FIG. 8 the compartment outlet 64 of one compartment 54 of the insert 50 is brought into register with the dispensing outlet 20 of the container 10. At this point of registration each dimple 32, 33, 34 of the container base 14 will also engage with an indent 72, 73, 74 of the insert base 70. With the plug closure 24 of the circular exit 22 of the dispensing outlet 20 removed the measured powder portion contents of the one compartment 54 may then be dispensed via its compartment outlet 64 and the dispensing outlet 20. Where the powder portions comprise a powdered baby milk preparation, the dispensing outlet 20 is preferably sized and shaped for ready transfer of the powdered baby milk preparation into a baby bottle. After the dispensing operation is completed the plug closure 24 is replaced on the circular exit 22 of the dispensing outlet and typically, the sealing lid 5 is replaced to seal off the container mouth 18.

When all measured portions have been dispensed from the compartments 52, 53, 54 the container 10; lid 5; and insert 50 of the first dispenser 1 may be separated for washing thereof in a dishwasher or kitchen sink. The component parts may then be re-assembled after washing for commencement of another filling operation.

Figure 10:
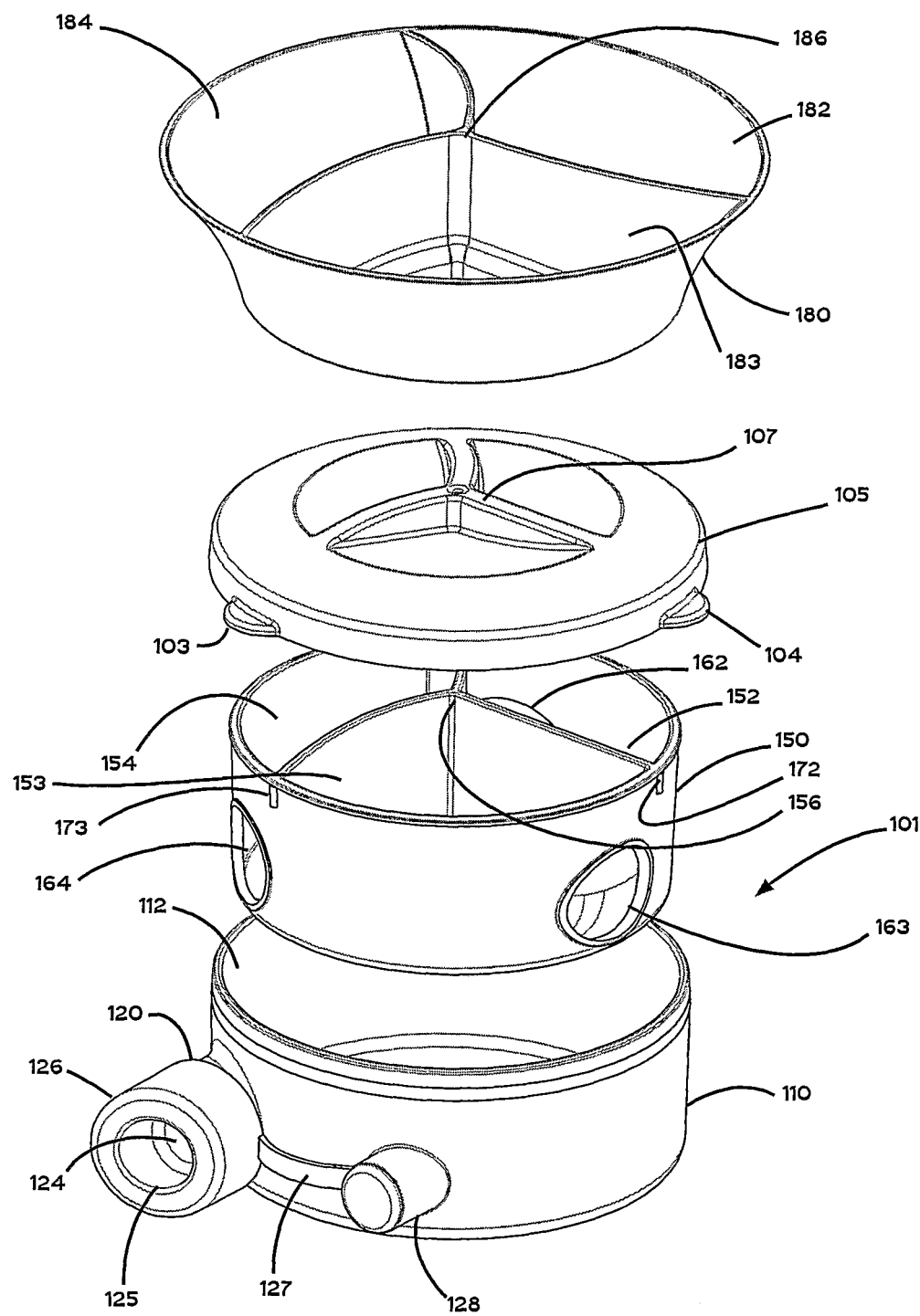
FIG. 10 shows an exploded perspective view of the a second dispenser with sealing lid herein that is also provided with a filling funnel.

FIGS. 10 to 15 show aspects of a second dispenser herein that may be appreciated to be a variation of the first dispenser of FIGS. 1 to 9. FIG. 10 also shows an optional filling funnel 180 that may be appreciated to be a variant of the funnel 80 of FIG. 9.

Figure 11:
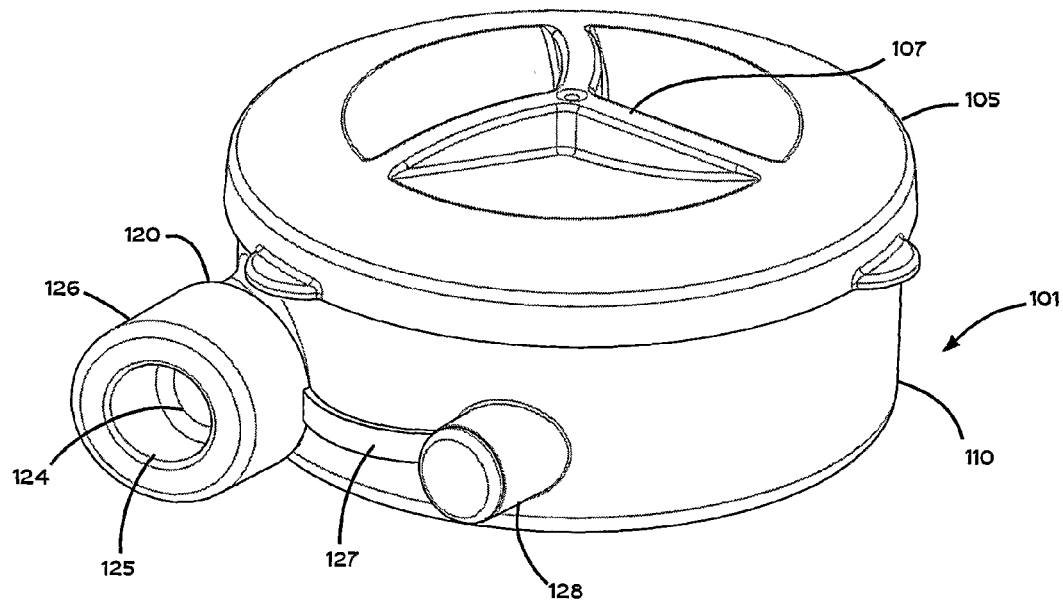
FIG. 11 shows a perspective view of the second dispenser with sealing lid of FIG. 10.

Referring to FIGS. 10 to 15, there is shown a container 110 that defines an interior in the form of a basin 112 that is arranged for receipt of an insert 150 to provide the first dispenser 101 herein as shown in assembled form in FIG. 11. That second dispenser 101 may be provided with a sealing lid 105 made of a transparent material as shown in FIGS. 10 and 11.

Figure 14:
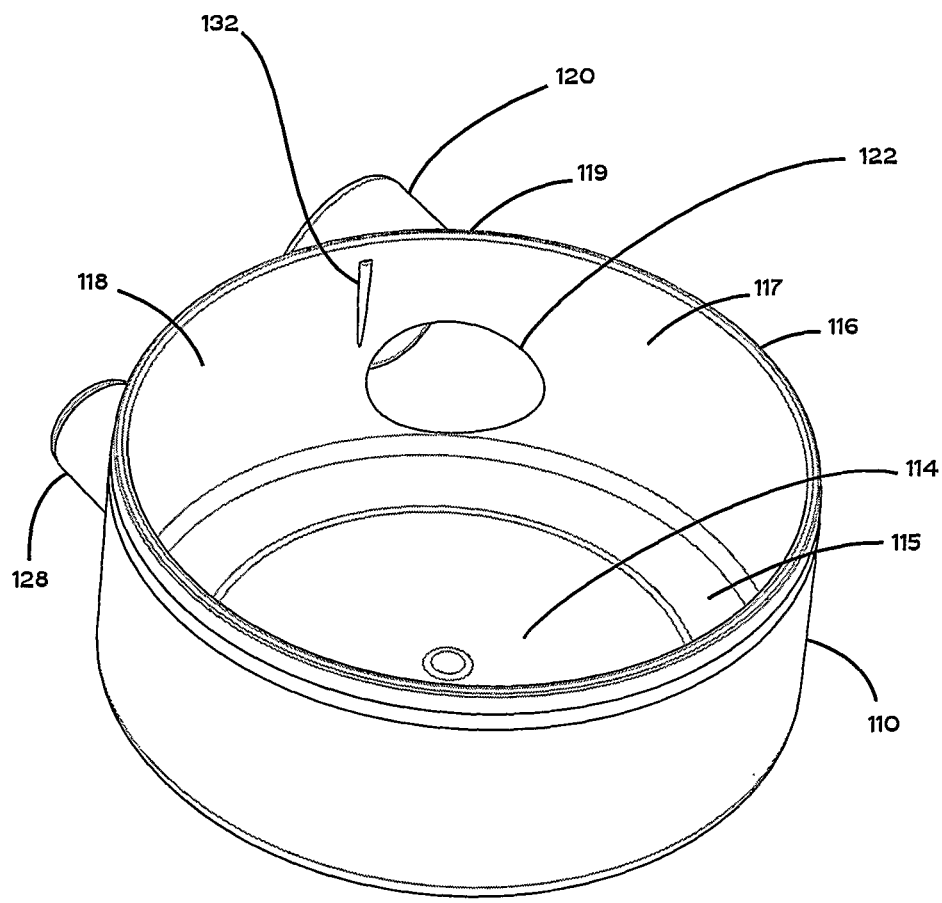
FIG. 14 shows a perspective view from above of the container of the second dispenser of FIGS. 10 to 13 absent its plug closure.
Figure 15:
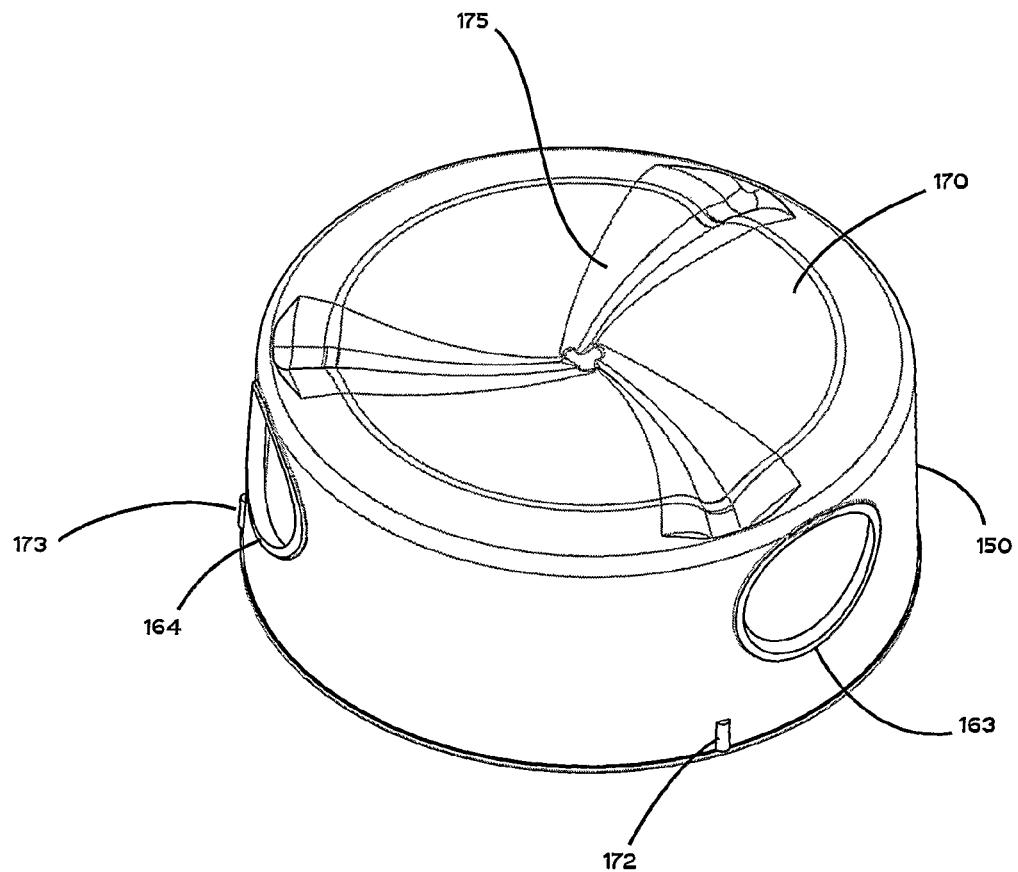
FIG. 15 shows a perspective underside view of the insert of the second dispenser of FIGS. 10 to 13.

In more detail and with particular reference to FIG. 14, the container 110 may be seen to comprise a circular inner base 114; a circumferential basin wall 116 extending from said circular inner base 114 and defining both a lower circumferential wall portion 115 that extends at an obtuse angle from the base 114 and an upper circumferential wall portion 117 that is perpendicular to the circular base 114; and a circular mouth 118 defined by the uppermost extent of the upper circumferential wall portion 117. The sealing lid 105 may be seen to reversibly attach in snap-fit fashion to rim 119 that extends around the mouth 118 of the container 110. Finger grips 103, 104 are also provided (two only visible) spaced at 120° angular separation about the sealing lid 105.

The container 110 may also be seen to be provided at the upper portion 117 of the circumferential basin wall 116 with a dispensing outlet 120 in the form of a spout defining a circular exit hole 122. That circular exit hole 122 is provided with a reversible closure in the form of plug 124 having plug surround 126, which attaches by means of tether 127 to the container 110. The plug surround 126 is also shaped with a central circular aperture 125 arranged for docked receipt by plug docking element 128 also provided to the container 110. It will be appreciated that the dispensing outlet 120, 122 may be unplugged by removal of the plug 124, which may then conveniently be docked by means of its central circular aperture 125 to the plug docking element 128.

Insert 150, which defines a reverse basin-like outer profile (see FIGS. 10 and 15), is receivable by and movable within the basin 112 interior of the container 110. The insert 150 defines a basin-like interior and is provided with three radially-spaced (120° angular segments) open compartments 152, 153, 154 each arranged for holding a distinct portion of a powdered foodstuff. The open compartments 152, 153, 154 are defined by a propeller-like wall divider structure 156. Each open compartment 152, 153, 154 of the insert 150 is provided with a compartment outlet 162, 163, 164. As will become clear from the more detailed later description, the compartment outlets 162, 163, 164 are arranged such that by rotatably moving the insert 150 within the basin 112 of the container 110 one compartment outlet 162, 163, 164 at a time may be brought into registration with the dispensing outlet 120, 122 for dispensing of the distinct portion of the powdered foodstuff held within the compartment 152, 153, 154 associated therewith. The sealing lid 105 is provided with a propeller-shaped cavity portion 107 that is arranged when the lid is in place (i.e. as at FIG. 11) to receive and retain the propeller-shaped wall divider 156 of the insert 150, thereby preventing the insert 150 moving around within the container 110 during transit. The base 170 of the insert 150 is provided with a propeller-shaped styling feature 175.

Referring in particular to FIG. 14 it may be seen that the inner wall 116 of the container 110 is provided with engagement features in the form of three protruding vertical ribs 132 (only one visible) spaced at 120° angular spacing relative to each other. The outer wall of the insert 150 is likewise provided with corresponding engagement features in the form of three vertical ribs 172, 173 (two only visible) also spaced at 120° angular spacing relative to each other. The vertical ribs 132 of the container 110 and those vertical ribs 172, 173 of the insert 150 are arranged such as to come into engagement with each other when a compartment outlet 162, 163, 164 of the insert 150 has been brought into registration with the dispensing outlet 120 for dispensing therefrom.

FIG. 10 also shows an optional feature of the second dispenser 101 herein in the form of a funnel 180 that is arranged for removable fitting to the rim 119 that defines the mouth 118 of the container 110. It will be seen that the interior of the funnel 180 is sub-divided by a propeller-like funnel wall structure 186 to define an arrangement funnel compartments 182, 183, 184 that mirror the arrangement of the compartments 152, 153, 154 of the insert 150.

Figure 12:
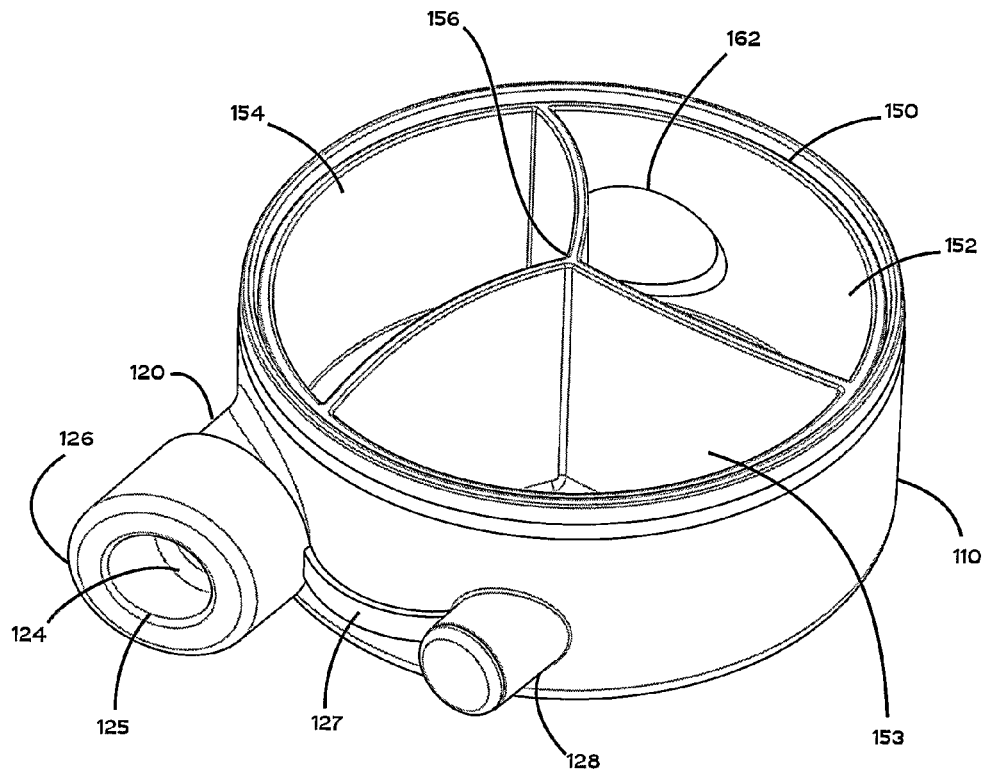
FIG. 12 shows a perspective view from above of the second dispenser of FIGS. 10 and 11 absent its sealing lid.

Use of the second dispenser 101 is now described. In a filling operation, the insert 150 sits within the container 110 and the sealing lid 105 is removed (i.e. the configuration as shown in FIG. 12). One or more (typically, all) of the compartments 152, 153, 154 of the insert 150 are loaded, each with a measured portion of a powdered foodstuff. The funnel 180 as shown in FIG. 10 may be used in this filling operation (much as shown in FIG. 9 in relation to the first dispenser 1) or alternatively, the compartments 152, 153, 154 are simply loaded with a spoon-like measure. The sealing lid 105 may then be replaced in snap-fit fashion and the second dispenser 101 may then be carried around until dispensing of a powdered foodstuff portion is required.

Figure 13:
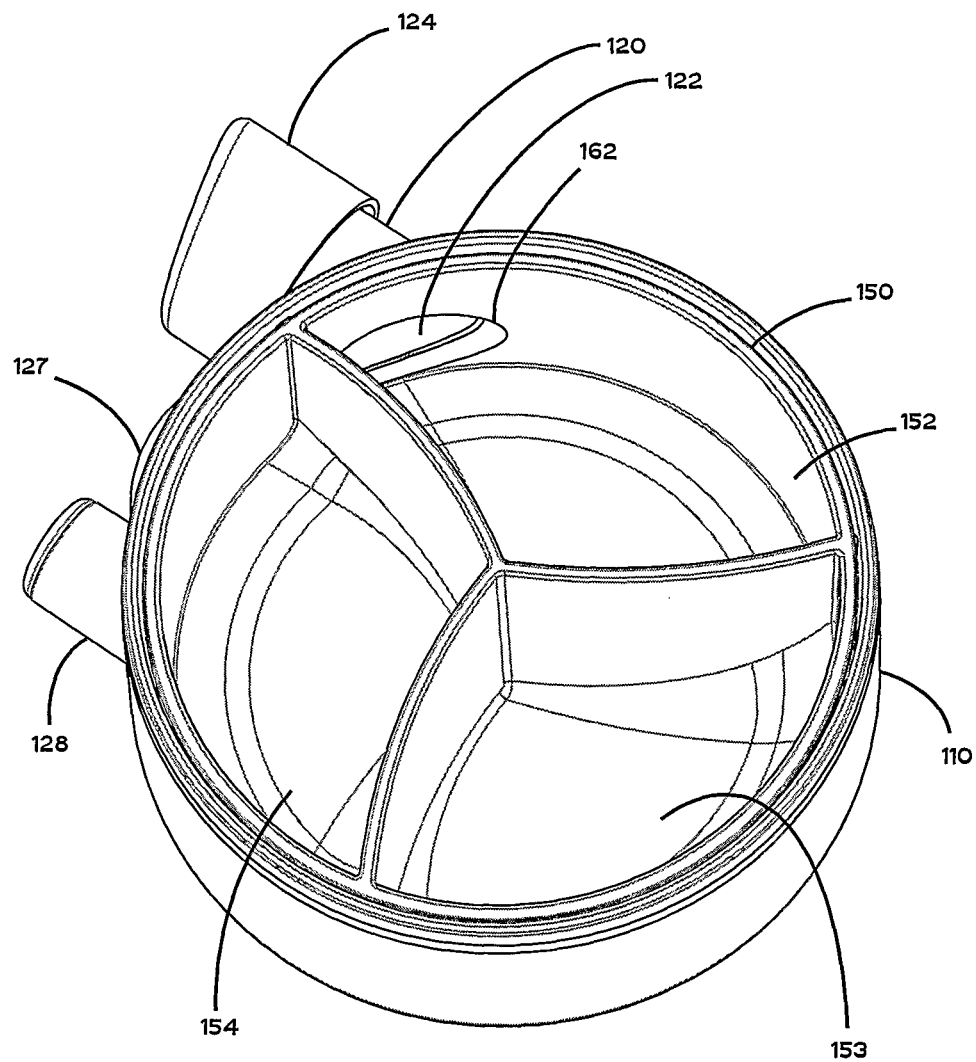
FIG. 13 shows a near plan view of the second dispenser of FIGS. 10 and 11 absent its sealing lid.

In a dispensing operation, the sealing lid 105 is removed and the insert 150 rotated within the basin-like interior 112 of the container until as shown at FIG. 13 the compartment outlet 162 of one compartment 152 of the insert 150 is brought into register with the dispensing outlet 120, 122 of the container 110. At this point of registration each rib 132 of the inner container wall 116 will also engage with one rib 172, 173 of the outer wall of the insert 150. With the plug closure 124 of the circular exit 122 of the dispensing outlet 120 removed and the plug 124 optionally docked at docking element 128 the measured powder portion contents of the one compartment 152 may then be dispensed via its compartment outlet 162 and the dispensing outlet 120. Where the powder portions comprise a powdered baby milk preparation, the dispensing outlet 120 is preferably sized and shaped for ready transfer of the powdered baby milk preparation into a baby bottle. After the dispensing operation is completed the plug closure 124 is replaced on the circular exit 122 of the dispensing outlet and typically, the sealing lid 105 is replaced to seal off the container mouth 118.

When all measured portions have been dispensed from the compartments 152, 153, 154 the container 110; lid 105; and insert 150 of the second dispenser 101 may be separated for washing thereof in a dishwasher or kitchen sink. The component parts may then be re-assembled after washing for commencement of another filling operation.

The application of which this description and claims form part may be used as a basis for priority in respect of any subsequent application. The claims of such subsequent application may be directed to any feature or combination of features described therein. They may take the form of product, method or use claims and may include, by way of example and without limitation, one or more of the following claims:

The invention claimed is:

1. A dispenser for use in dispensing distinct portions of a powdered foodstuff comprising
a container defining an interior in the form of a basin, said basin provided with a dispensing outlet;
a sealing lid provided to said container; and
receivable by and movable within said basin, an insert provided with plural open compartments each for holding a distinct portion of said powdered foodstuff,
wherein each open compartment of said insert is provided with a compartment outlet arranged such that by moving the insert within the basin one said compartment outlet at a time is brought into registration with the dispensing outlet for dispensing of said distinct portion of the powdered foodstuff held thereby,
and wherein said sealing lid is provided with a retainer feature arranged to interact with the insert to prevent movement of the insert when the sealing lid is in place.

2. A dispenser according to claim 1, wherein the basin comprises a circular base; a circumferential basin wall extending from said circular base; and
a circular mouth defined by the uppermost extent of said circumferential basin wall.

3. A dispenser according to claim 2, wherein the circumferential basin wall is perpendicular to the circular base.

4. A dispenser according to claim 2, wherein the dispensing outlet is provided to the circumferential basin wall.

5. A dispenser according to claim 2, wherein the dispensing outlet is provided to the circular base of the basin.

6. A dispenser according to claim 1, wherein the dispensing outlet is provided with a closure for reversible closing off thereof.

7. A dispenser according to claim 1, wherein the insert defines a reverse basin-like outer profile.

8. A dispenser according to claim 1, wherein the insert defines a basin-like interior and the compartments are arranged in radially spaced fashion about that interior.

9. A dispenser according to claim 1, wherein the container and the insert are provided with visual indicators for indicating when a compartment outlet of the insert has been brought into registration with the dispensing outlet.

10. A dispenser according to claim 1, wherein the container and the insert are provided with engagement features that come into engagement when a compartment outlet of the insert has been brought into registration with the dispensing outlet.

11. A dispenser according to claim 10, wherein said engagement features of the container and/or insert take the form of one or more protrusions or indents.

12. A dispenser according to claim 10, wherein the base of the container is provided with one or more engagement features at the inner surface thereof, and the base of the insert is provided with one or more corresponding engagement features at the outer surface thereof.

13. A dispenser according to claim 12, wherein the one or more engagement features are radially spaced about the centre of the base of the insert and/or the base of the container.

14. A dispenser according to claim 10, wherein a side wall of the container is provided with one or more engagement features at the inner surface thereof, and a side wall of the insert is provided with one or more corresponding engagement features at the outer surface thereof.

15. A dispenser according to claim 14, wherein the one or more engagement features are radially spaced about the side wall of the insert and/or the side wall of the container.

16. A dispenser according to claim 10, wherein the number of engagement features provided to each of the container and or the insert corresponds to the number of compartments of the insert.

17. A dispenser according to claim 1, wherein to assist with filling of the plural compartments of the insert, the dispenser is provided with a removable funnel.

18. A dispenser according to claim 17, wherein the funnel is arranged such that in use, a bottom-located funnel exit thereof sits about the mouth of the insert.

19. A dispenser according to claim 17, wherein the interior of the funnel is sub-divided by funnel walls to mirror the compartment walls of the insert.

20. The dispenser of claim 1 in kit of parts form.

21. A dispenser according to claim 1, wherein each open compartment of the insert has one or more compartment walls defining an upper edge and said retainer feature comprises a cavity shaped to receive part of said upper edge of said compartment walls of the insert.

22. A dispenser according to claim 21, wherein said cavity is propeller-shaped and arranged to receive a propeller-like portion of the upper edge of the compartment walls of the insert.

* * * * *